United States Patent
Kono (10) Patent No.: US 10,133,049 B2
(45) Date of Patent: Nov. 20, 2018

(54) MICROSCOPE APPARATUS AUTOMATICALLY CHANGES ILLUMINATION ACCORDING TO VARIOUS OBSERVATION METHODS

(71) Applicant: OLYMPUS CORPORATION, Hachioji-shi, Tokyo (JP)

(72) Inventor: Takayuki Kono, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/672,148

(22) Filed: Aug. 8, 2017

(65) Prior Publication Data

US 2018/0045942 A1 Feb. 15, 2018

(30) Foreign Application Priority Data

Aug. 9, 2016 (JP) ................... 2016-156792

(51) Int. Cl.
 *G02B 21/06* (2006.01)
 *H05B 39/06* (2006.01)
 H05B 37/02 (2006.01)

(52) U.S. Cl.
 CPC ............. *G02B 21/06* (2013.01); *H05B 39/06* (2013.01); *H05B 37/0209* (2013.01)

(58) Field of Classification Search
 CPC ................................ G02B 21/06; H05B 39/06
 USPC ...................................................... 359/385
 See application file for complete search history.

(56) References Cited

U.S. PATENT DOCUMENTS

| 8,076,869 B2* | 12/2011 | Shatford | H05B 33/0803 315/291 |
|---|---|---|---|
| 8,451,534 B2 | 5/2013 | Tamura et al. | |
| 2004/0190132 A1* | 9/2004 | Laschke | G02B 21/06 359/385 |
| 2005/0248839 A1* | 11/2005 | Yamaguchi | G02B 21/16 359/385 |

(Continued)

FOREIGN PATENT DOCUMENTS

| JP | 11052250 A | * | 2/1999 | ............ G02B 21/06 |
| JP | 2000055823 A | * | 2/2000 | ............ G01N 21/88 |

(Continued)

OTHER PUBLICATIONS

EPO Translation of JP 11052250 A from https://iq.ip.com/discover (InnovationQ Plus), performed on Jul. 31, 2018.*

(Continued)

*Primary Examiner* — Frank Font
(74) *Attorney, Agent, or Firm* — Holtz, Holtz & Volek PC (57) ABSTRACT

A microscope apparatus includes: a light source configured to emit illumination light to illuminate a specimen; a dimming input unit configured to set and input a light amount of the light source in a predetermined dimming range; a switching unit configured to switch a first instruction value instructing the light amount of the light source to a second instruction value larger than the first instruction value when a switching signal to switch the light amount of the light source is input; and a control unit configured to control a light amount of the illumination light emitted from the light source according to the first instruction value set and input by the dimming input unit or the second instruction value obtained by switching by the switching unit.

6 Claims, 8 Drawing Sheets

(56) References Cited

U.S. PATENT DOCUMENTS

2011/0013010 A1* 1/2011 Shirota ............... G02B 21/365
348/79
2015/0116478 A1* 4/2015 Fujiwara ............... G02B 21/06
348/79

FOREIGN PATENT DOCUMENTS

| JP | 2001242385 | A |   | 9/2001 |  |           |
|----|------------|---|---|--------|--|-----------|
| JP | 2003185931 | A | * | 7/2003 | ............ | G02B 21/06 |
| JP | 2004138818 | A | * | 5/2004 | ............ | G02B 21/00 |
| JP | 4464654    | B2| * | 5/2010 | ............ | G02B 21/06 |
| JP | 2013050613 | A | * | 3/2013 | ............ | G02B 21/06 |
| JP | 5253309    | B2|   | 7/2013 |  |           |
| JP | 2016118615 | A | * | 6/2016 | ............ | G02B 21/06 |
| WO | WO 03052483 | A1| * | 6/2003 | ............ | G02B 21/36 |

OTHER PUBLICATIONS

EPO Translation of JP 2000055823 A from https://iq.ip.com/discover (InnovationQ Plus), performed on Jul. 31, 2018.*
EPO Translation of WO 03052483 A1 from https://iq.ip.com/discover (InnovationQ Plus), performed on Jul. 31, 2018.*
EPO Translation of JP 2003185931 A from https://iq.ip.com/discover (InnovationQ Plus), performed on Jul. 31, 2018.*
EPO Translation of JP 2004138818 A from https://iq.ip.com/discover (InnovationQ Plus), performed on Jul. 31, 2018.*
EPO Translation of JP 4464654 B2 from https://iq.ip.com/discover (InnovationQ Plus), performed on Jul. 31, 2018.*
EPO Translation of JP 2013050613 A from https://iq.ip.com/discover (InnovationQ Plus), performed on Jul. 31, 2018.*
EPO Translation of JP 2016118615 A from https://iq.ip.com/discover (InnovationQ Plus), performed on Jul. 31, 2018.*

* cited by examiner

MICROSCOPE APPARATUS AUTOMATICALLY CHANGES ILLUMINATION ACCORDING TO VARIOUS OBSERVATION METHODS

CROSS-REFERENCE TO RELATED APPLICATION

This application is based upon and claims the benefit of priority from Japanese Patent Application No. 2016-156792, filed on Aug. 9, 2016, the entire contents of which are incorporated herein by reference.

BACKGROUND

The present disclosure relates to a microscope apparatus.

In the related art, various observation methods such as phase contrast observation, differential interference contrast observation, dark-field observation, and polarization observation have been used in microscope apparatuses in addition to general bright-field observation and transmission observation. According to these observation methods, it is possible to easily observe features that are hardly observed in the bright-field observation or the transmission observation, such as shape distribution, impurities, and foreign matters of an object to be observed.

Optical principles of the above-described observation methods are different from each other, and accordingly, the required amount of illumination light required also differs. Thus, it is necessary to adjust the light amount of the illumination light according to the observation method. As a technique to adjust the light amount according to the observation method, a technique to control the light amount of illumination light according to input information is known (for example, see Japanese Laid-open Patent Publication No. 2001-242385 and Japanese Patent No. 5253309). In Japanese Laid-open Patent Publication No. 2001-242385, light source control according to an observation method is performed by detecting the observation method and controlling a light amount of illumination light according to a detection result. In addition, the light amount of illumination light is controlled using an instruction value allocated for each observation method and a voltage value according to a type of an objective lens with an instruction input from an input button to switch an observation method as a trigger in Japanese Patent No. 5253309.

SUMMARY

A microscope apparatus according to one aspect of the present disclosure includes: a light source configured to emit illumination light to illuminate a specimen; a dimming input unit configured to set and input a light amount of the light source in a predetermined dimming range; a switching unit configured to switch a first instruction value instructing the light amount of the light source to a second instruction value larger than the first instruction value when a switching signal to switch the light amount of the light source is input; and a control unit configured to control a light amount of the illumination light emitted from the light source according to the first instruction value set and input by the dimming input unit or the second instruction value obtained by switching by the switching unit.

The above and other features, advantages and technical and industrial significance of this disclosure will be better understood by reading the following detailed description of presently preferred embodiments of the disclosure, when considered in connection with the accompanying drawings.

DETAILED DESCRIPTION

Hereinafter, modes for carrying out the present disclosure will be described in detail with reference to the drawings. Incidentally, the present disclosure is not limited to the following embodiments. In addition, the respective drawings referred to in the following description schematically illustrate shapes, sizes, and positional relationships merely to such a degree that the content of the present disclosure is understandable. That is, the present disclosure is not limited only to the shapes, sizes, and positional relationships exemplified in the respective drawings.

Embodiment

Figure 1:
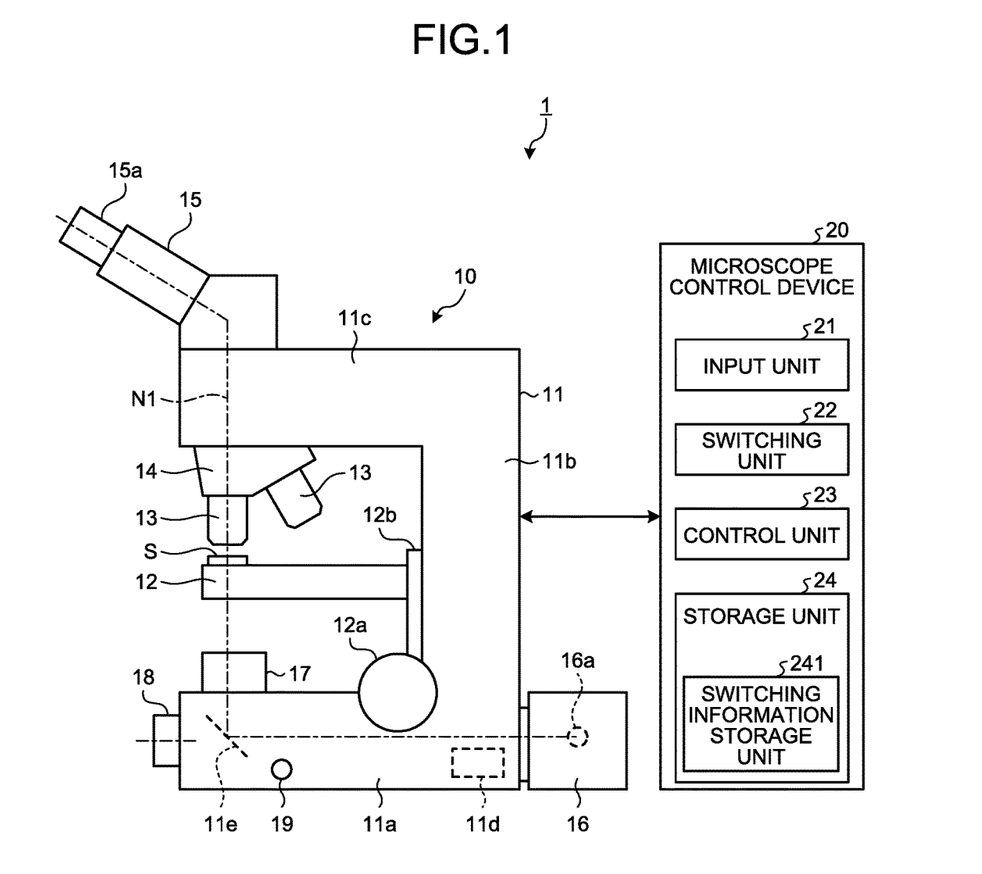
FIG. 1 is a schematic diagram illustrating a schematic configuration of a microscope apparatus according to an embodiment of the present disclosure.

First, a microscope apparatus according to an embodiment of the present disclosure will be described with reference to the drawings. FIG. 1 is a schematic diagram illustrating a schematic configuration of the microscope apparatus according to the embodiment of the present disclosure. As illustrated in FIG. 1, a microscope apparatus 1 includes a microscope 10 configured by attaching a stage 12, an objective lens 13, an illumination unit 16, and the like to a main body 11, and a microscope control device 20 that performs control of the illumination unit 16 and the like which are attached to the microscope 10.

The main body 11 includes a base portion 11a which is directly placed in a place, such as a desk, where the microscope apparatus 1 is installed, a pillar portion 11b erected on a back side of the base portion 11a, and an arm portion 11c extending toward a front side of the microscope 10 from an upper end of the pillar portion 11b. A control board 11d, which is electrically connected to the microscope control device 20 and controls the entire microscope 10, is provided in the base portion 11a. The control board 11d relays power supplied from the outside to each unit or includes its own power supply and relays the power to each unit.

The stage 12 on which a specimen S as an object to be observed is placed is provided on a front surface of the pillar portion 11b. The stage 12 moves in a direction of an optical axis intersecting the stage 12 as a movable guide 12b is driven, for example, by operating a focus handle 12a. In addition, the stage 12 may be configured to be movable on a plane orthogonal to the optical axis direction by an operation handle (not illustrated). The focus handle 12a is configured to rotate about its own axis. The movable guide 12b moves up and down in conjunction with rotation of the focus handle 12a installed on the base portion 11a. In addition, such vertical movement may be implemented by a known means such as a gear and a rack pinion. Incidentally, the specimen S is held in, for example, a containing member such as a petri dish and a slide glass.

The arm portion 11c is provided with a revolver 14 and an observation unit 15. The revolver 14 is installed at a lower part of the arm portion 11c on a distal end side in an extending direction. For example, a plurality of the objective lenses 13 having different magnifications may be mounted to the revolver 14, and the objective lens 13 having a desired magnification may be inserted into an optical path N1 to perform observation by rotating the revolver 14. The observation unit 15 is installed at an upper part of the arm portion 11c on the distal end side in the extending direction and includes an eyepiece lens 15a. The observation unit 15 includes a tube lens and a prism (not illustrated), guides observation light to the eyepiece lens 15a such that an observation image is formed on the eyepiece lens 15a. The eyepiece lens 15a is a lens configured to view an intermediate image formed by the tube lens or the like in an enlarged manner.

In addition, an illumination unit 16 to emit transmitted illumination light is detachably attached to the microscope 10. The illumination unit 16 is controlled to turn on and off a light source under control of the microscope control device 20.

The illumination unit 16 forms a part of an illumination optical system for transmission observation and includes a light source 16a. In addition, the illumination unit 16 has an optical system (not illustrated) such as a collector lens. The light source 16a is implemented using, for example, a light emitting diode (LED) light source (solid light source), and is controlled to be driven (emit light) by the microscope control device 20. The LED light source is configured using, for example, an LED of a single color and a fluorescent member and emits white illumination light. The fluorescent member forms a dome shape with a phosphor and covers the LED. In this configuration, the phosphor is excited by light emitted from the LED to emit light.

In addition, a mirror 11e to fold the illumination light emitted from the illumination unit 16 toward the specimen S (stage 12) and a condenser 17 to condense the illumination light are provided in the base portion 11a.

The microscope 10 includes a dimming input unit 18 that performs input of information relating to the light amount of the light source 16a of the illumination unit 16, and a switch button 19 that switches an upper limit value of the light amount of illumination light. The dimming input unit 18 is attached to a surface of the base portion 11a, that is, the surface on the front surface side. The dimming input unit 18 is configured using a dial or the like that is rotatable about a predetermined axis, and is capable of performing change input of the light amount in accordance with an instruction position changing due to the rotation of the dial. The dimming input unit 18 inputs angle information indicating a rotation angle from a reference position to the microscope control device 20. It is preferable that a side surface of the dimming input unit 18 be subjected to a process of improving operability of the rotation operation performed by a user, such as knurling.

The switch button 19 is attached to a surface of the base portion 11a, that is, the surface on the side surface side. The switch button 19 is attached to the surface of the base portion 11a so as to be able to freely advance and retreat, and may perform input of a switching signal to switch the upper limit value of the light amount whenever being pressed by the user. The switch button 19 is capable of inputting the switching signal by being pressed and may adopt a momentary method, for example.

The microscope control device 20 includes an input unit 21, a switching unit 22, a control unit 23, and a storage unit 24.

The input unit 21 receives input of information on the rotation angle of the dimming input unit 18 and receives the switching signal input by pressing the switch button 19.

The switching unit 22 switches a first instruction value according to the instruction position of the dimming input unit 18, which is an instruction value of the light amount of illumination light, to a second instruction value larger than the first instruction value when the input unit 21 receives input of the switching signal. The second instruction value is calculated, for example, by adding an addition value stored in the storage unit 24 to the first instruction value when there is the switching instruction.

The control unit 23 is configured using a central processing unit (CPU) or the like and performs driving control of each component of the microscope control device 20 and the illumination unit 16, input and output control of information with respect to each component of the microscope 10, and the like.

The storage unit 24 is implemented using a read only memory (ROM), and a random access memory (RAM), a hard disk, and the like that store a calculation parameter of each processing and data, and stores various programs such as a control program executed by the microscope control device 20, and various types of data to be executed in the program. The storage unit 24 includes a switching information storage unit 241 that stores a relationship table between the instruction value and the light amount, a range (dimming range) of the first instruction value obtained by the dimming input unit 18, an upper limit value of the second instruction value obtained after switching by the switch button 19, and the like. The instruction value relating to the light amount is stored in the switching information storage unit 241 in association with the angle information input from the dimming input unit 18. The upper limit value includes a first upper limit value of the first instruction value obtained by the dimming input unit 18 and a second upper limit value of the second instruction value obtained by switching by pressing the switch button 19. The second upper limit value is larger than the first upper limit value, and for example, is 1.1 to 3.0 times and preferably 1.5 to 2.5 times. In addition, the switching information storage unit 241 stores a difference between the second upper limit value and the first upper limit value as the addition value to be added to the first instruction value at the time of switching the light amount. The addition value is a value for significantly changing the first instruction value and exceeds the first upper limit value when being added to the first instruction value, and for example, the addition value is set to be equal to or larger than the first upper limit value in this case.

The microscope apparatus 1 is configured such that the specimen S is irradiated with illumination light for transmission observation from the light source 16a via the mirror 11e and the condenser 17, and the observation light transmitted through the specimen S or the observation light emitted from the specimen S passes through the objective lens 13 so as to enable visual observation through the eyepiece lens 15a. At this time, when the user operates the dimming input unit 18 or the switch button 19, the light amount is changed to the light amount according to the operation under the control of the microscope control device 20.

Figure 2:
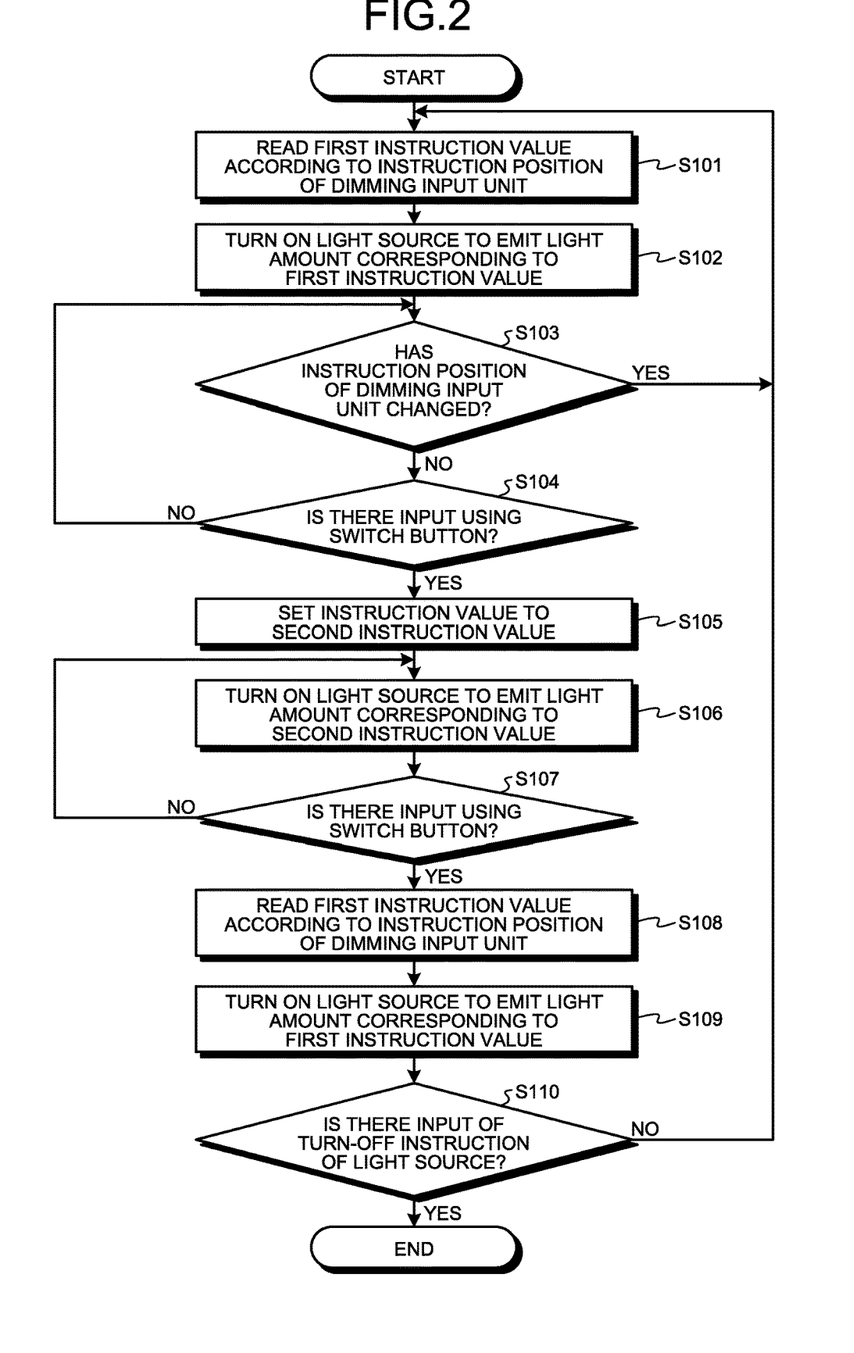
FIG. 2 is a flowchart for describing a dimming operation performed by the microscope apparatus according to the embodiment of the present disclosure.

Subsequently, the dimming operation performed by the microscope apparatus 1 will be described with reference to the drawings. FIG. 2 is a flowchart for describing the dimming operation performed by the microscope apparatus according to the embodiment of the present disclosure. In this dimming operation, the light source of the illumination unit 16 is controlled under the control of the control unit 23 via the control board 11d.

When the microscope 10 and the microscope control device 20 are powered on, the input unit 21 reads the first instruction value according to the instruction position of the dimming input unit 18 with reference to the switching information storage unit 241 from the angle information input from the dimming input unit 18 (Step S101).

When acquiring the first instruction value from the input unit 21, the control unit 23 turns on the light source 16a so as to emit the illumination light having the light amount corresponding to the first instruction value (Step S102).

Thereafter, the control unit 23 determines whether or not the instruction position in the dimming input unit 18 has changed (Step S103). Specifically, the control unit 23 causes the input unit 21 to read the first instruction value and determines whether or not the previously acquired first instruction value and the currently acquired first instruction value match each other. When the first instruction values do not match each other, the control unit 23 determines that the instruction position has changed (Step S103: Yes), returns to Step S101, and performs the light source control based on the newly input first instruction value. On the other hand, when the first instruction values match each other, the control unit 23 determines that the instruction position has not changed (Step S103: No), and the process proceeds to Step S3104.

In Step S104, the control unit 23 determines whether or not there is input performed by the switch button 19. Specifically, the control unit 23 determines whether or not the input unit 21 has received input of the switching signal from the switch button 19. When the input unit 21 has not received the input of the switching signal and determines that there is no input from the switch button 19 (Step S104: No), the control unit 23 returns to Step S103. On the other hand, when the input unit 21 has received the input of the switching signal and determines that there is input from the switch button 19 (Step S104: Yes), the control unit 23 proceeds to Step S105.

In Step S105, the switching unit 22 switches the instruction value from the currently set first instruction value to the second instruction value with reference to the switching information storage unit 241. Specifically, the switching unit 22 adds the addition value, which is the difference between the second upper limit value and the first upper limit value, to the currently set first instruction value, and sets the added value as the second instruction value. Accordingly, the amount of light emitted from the light source 16a is increased by a predetermined addition value. Incidentally, when the currently set instruction value is the first upper limit value, the second instruction value obtained after addition becomes the second upper limit value.

In Step S106 subsequent to Step S105, the control unit 23 turns on the light source 16a so as to emit the illumination light having the light amount corresponding to the second instruction value set in Step S105.

In Step S107 subsequent to Step S106, the control unit 23 determines whether or not there is input performed by the switch button 19. The control unit 23 determines whether or not the input unit 21 has received input of the switching signal from the switch button 19 in the same manner as in Step S104. When determining that there is no input from the switch button 19 (Step S107: No), the control unit 23 returns to Step S106. On the other hand, when determining that there is input from the switch button 19 (Step S107: Yes), the control unit 23 proceeds to Step S108.

In Step S108, the input unit 21 performs read of the first instruction value according to the instruction position of the dimming input unit 18 from the angle information input from the dimming input unit 18 with reference to the switching information storage unit 241.

In Step S109 subsequent to Step S108, the control unit 23 turns on the light source 16a so as to emit the illumination light having the light amount corresponding to the first instruction value when acquiring the first instruction value from the input unit 21.

In Step S110 subsequent to Step S109, the control unit 23 determines whether or not there is input of a turn-off instruction of the light source 16a. Specifically, the control unit 23 determines whether or not the input unit 21 has received input of a turn-off instruction of the light source 16a. The turn-off instruction includes an instruction to turn off the power supply of the microscope 10 and an instruction to turn off only the light source 16a, and is input from a switch (not illustrated) provided in the microscope 10 or the illumination unit 16, and a switch (including a GUI and the like) provided in the microscope control device 20. When determining that there is no turn-off instruction (Step S110: No), the control unit 23 returns to Step S101 to continue the light source control. On the other hand, when determining that there is the turn-off instruction (Step S110: Yes), the control unit 23 ends the light source control described above.

Figure 3:
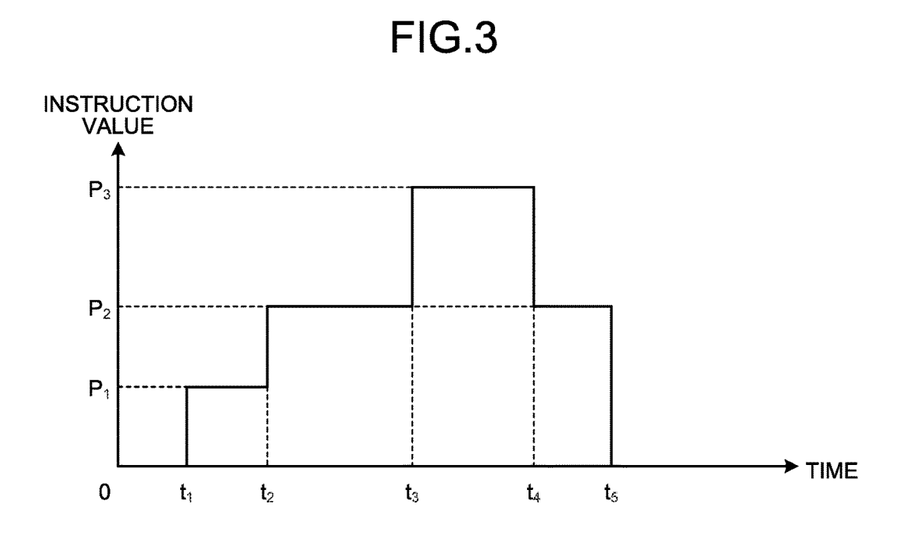
FIG. 3 is a view for describing the dimming operation performed by the microscope apparatus according to the embodiment of the present disclosure.

Here, a change of the instruction value over time in the above-described dimming operation will be described with reference to FIG. 3. FIG. 3 is a view for describing the dimming operation performed by the microscope apparatus according to the embodiment of the present disclosure. FIG. 3 is a graph with the horizontal axis representing time and the vertical axis representing the instruction value. As illustrated in FIG. 3, the illumination light begins to be emitted by the light source 16a at time $t_1$, and illumination light having a light amount corresponding to a first instruction value $P_1$ is emitted. Thereafter, the dimming input unit 18 is rotated by the user at time $t_2$, and the first instruction value is changed to $P_2$. The first instruction value $P_2$ is an upper limit value in normal illumination. Thereafter, when the switch button 19 is pressed at time $t_3$, the instruction value is changed to a second instruction value $P_3$ which is larger than the first instruction value $P_2$ which is the upper limit value. Accordingly, it is possible to perform observation with the light amount larger than that of normal illumination. At this time, the switching unit 22 sets the second instruction value by adding the addition value stored in the switching information storage unit 241 to the first instruction value $P_2$. Thereafter, when the switch button 19 is pressed again at time $t_4$, the instruction value returns to the first instruction value $P_2$ that is the upper limit value of the first instruction value. When there is the turn-off instruction of the light source 16a at time $t_5$, the control unit 23 sets the instruction value to zero.

Since it is configured such that the set instruction value of the light amount is increased by pressing the switch button 19 in addition to the operation of the light amount using the dimming input unit 18 according to the above-described embodiment, it is possible to easily and quickly increase the light amount by a predetermined instruction value (addition value) by pressing the switch button 19 in a range of the large light amount while performing fine adjustment using the dimming input unit 18 in a range of the small light amount. As a result, brightness of a field of view may be adjusted with a simple operation system.

The dimming operation according to the present embodiment is particularly advantageous in the case of performing observation with a high magnification when it is dark in the field of view, in a case where there are many specimens S in the field of view and a large amount of light is required, in the case of performing special microscopy such as phase contrast observation, polarization observation, differential interference contrast observation, dark-field observation, and fluorescence observation, and the case of using a microscope that divides an observation light path for conference.

Incidentally, the description has been given by exemplifying the case where the addition value is added to the first instruction value to calculate the second instruction value by pressing the switch button 19 in the above-described embodiment. However, the second instruction value may be set to a uniform value and the second instruction value of the set value may be set regardless of the instruction position of the dimming input unit 18 when the switch button 19 is pressed. In this case, the switching information storage unit 241 may store the second instruction value set in advance.

First Modified Example of Embodiment

Figure 4:
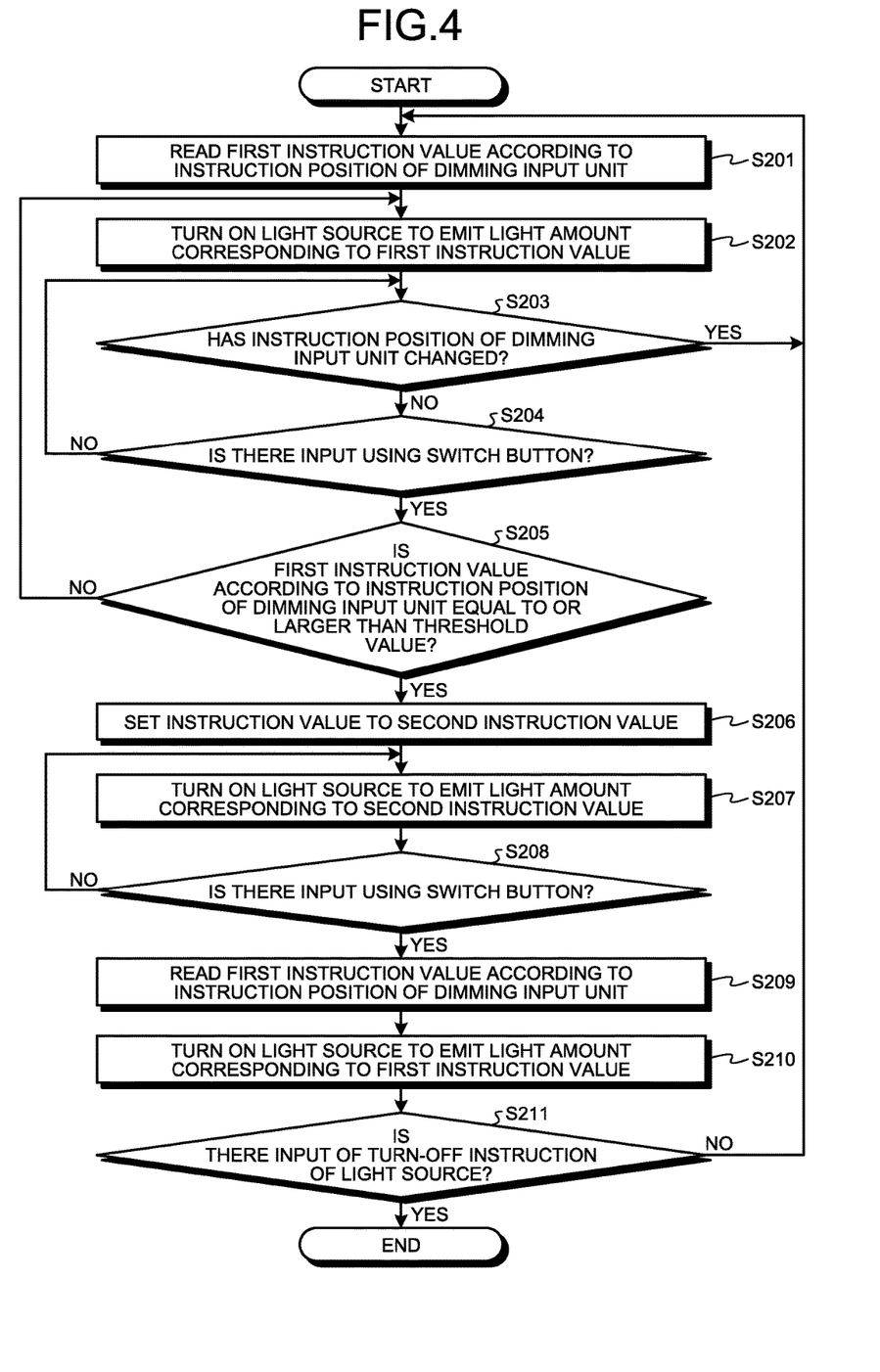
FIG. 4 is a flowchart for describing a dimming operation performed by a microscope apparatus according to a first modified example of the embodiment of the present disclosure.

Next, a first modified example of the embodiment of the present disclosure will be described. FIG. 4 is a flowchart for describing a dimming operation performed by a microscope apparatus according to the first modified example of the embodiment of the present disclosure. The microscope apparatus according to the first modified example has the same configuration as that of the microscope apparatus 1 described above. In this dimming operation, the light source 16a of the illumination unit 16 is controlled under control of the control unit 23.

When the microscope 10 and the microscope control device 20 are powered on, the input unit 21 reads a first instruction value according to an instruction position of the dimming input unit 18 based on angle information input from the dimming input unit 18 with reference to the switching information storage unit 241 (Step S201).

When acquiring the first instruction value from the input unit 21, the control unit 23 turns on the light source 16a so as to emit illumination light having a light amount corresponding to the first instruction value (Step S202).

Thereafter, the control unit 23 determines whether or not the instruction position of the dimming input unit 18 has changed (Step S203). The control unit 23 determines the change of the instruction position in the same manner as in the Step S103 of FIG. 2 described above. When determining that the instruction position has changed (Step S203: Yes), the control unit 23 returns to Step S201 and performs light source control based on a newly input first instruction value. On the other hand, when determining that the instruction position has not changed (Step S203: No), the control unit 23 proceeds to Step S204.

In Step S204, the control unit 23 determines whether or not there is input using the switch button 19. When determining that there is no input from the switch button 19 (Step S204: No) in the same manner as in the Step S104 of FIG. 2 described above, the control unit 23 returns to Step S203. On the other hand, when determining that there is input from the switch button 19 (Step S204: Yes), the control unit 23 proceeds to Step S205.

In Step S205, the switching unit 22 determines whether or not the first instruction value according to the instruction position of the dimming input unit 18 is equal to or larger than a threshold value. When determining that the first instruction value is smaller than the threshold value (Step S205: No), the control unit 23 returns to Step S202 and causes the light source 16a to emit illumination light having the light amount corresponding to the first instruction value according to the instruction position of the dimming input unit 18. On the other hand, when determining that the first instruction value is equal to or larger than the threshold value (Step S205: Yes), the control unit 23 proceeds to Step S206. Incidentally, the threshold value is set to a value between 50% and 80% of the first upper limit value. In this case, it is preferable that a value obtained by adding the addition value to the threshold value exceed the first upper limit value.

In Step S206, the switching unit 22 switches the instruction value from the currently set first instruction value of the light amount to the second instruction value with reference to the switching information storage unit 241.

In Step S207 subsequent to Step S206, the control unit 23 turns on the light source 16a so as to emit illumination light having a light amount corresponding to the second instruction value set in Step S206.

In Step S208 subsequent to Step S207, the control unit 23 determines whether or not there is input using the switch button 19. When determining that there is no input from the switch button 19 (Step S208: No), the control unit 23 returns to Step S207. On the other hand, when determining that there is input from the switch button 19 (Step S208: Yes), the control unit 23 proceeds to Step S209.

In Step S209, the input unit 21 performs read of the first instruction value according to the instruction position of the dimming input unit 18 based on the angle information input from the dimming input unit 18 with reference to the switching information storage unit 241.

In Step S210 subsequent to Step S209, when acquiring the first instruction value from the input unit 21, the control unit 23 turns on the light source 16a so as to emit the illumination light having the light amount corresponding to the first instruction value.

In Step S211 subsequent to Step S210, the control unit 23 determines whether or not there is input of a turn-off instruction of the light source 16a. The control unit 23 determines whether or not the input unit 21 has received the input of the turn-off instruction of the light source 16a in the same manner as in Step S110 of FIG. 2 described above. When determining that there is no turn-off instruction (Step S211: No), the control unit 23 returns to Step S201 and continues the light source control. On the other hand, when determining that there is the turn-off instruction (Step S211: Yes), the control unit 23 ends the light source control described above.

Figure 5:
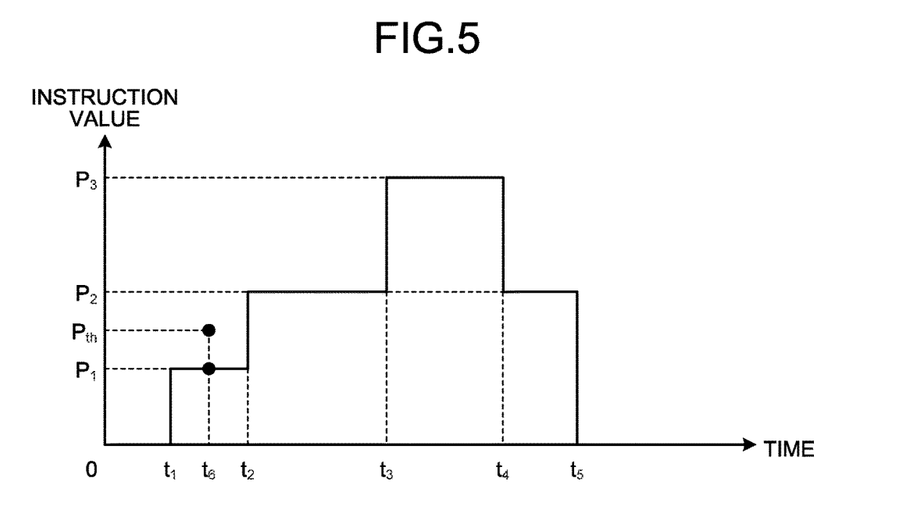
FIG. 5 is a view for describing the dimming operation performed by the microscope apparatus according to the first modified example of the embodiment of the present disclosure.

Here, a change of the instruction value over time in the above-described dimming operation will be described with reference to FIG. 5. FIG. 5 is a view for describing the dimming operation performed by the microscope apparatus according to the first modified example of the embodiment of the present disclosure. FIG. 5 is a graph with the horizontal axis representing time and the vertical axis representing the instruction value. As illustrated in FIG. 5, the illumination light begins to be emitted by the light source 16a at time $t_1$, and illumination light having a light amount corresponding to a first instruction value $P_1$ is emitted. Thereafter, when the switch button 19 is pressed at time $t_6$, the first instruction value P1 is maintained when the first instruction value $P_1$ is smaller than a threshold value $P_{th}$. Thereafter, the dimming input unit 18 is rotated by the user at time $t_2$, and the instruction value is changed to the first instruction value $P_2$. When the switch button 19 is pressed at time $t_3$, the instruction value is changed to the second instruction value $P_3$ obtained by adding the addition value to the first instruction value $P_2$ if the first instruction value $P_2$ is equal to or larger than the threshold value $P_{th}$. Accordingly, it is possible to perform observation with the light amount larger than that of normal illumination. Thereafter, when the switch button 19 is pressed again at time $t_4$, the second instruction value returns to the first instruction value $P_2$. When there is the turn-off instruction of the light source 16a at time $t_5$, the control unit 23 sets the instruction value to zero.

According to the first modified example described above, it is possible to achieve the effects of the above-described embodiment, and further, to suppress the light amount from unexpectedly increasing even when the switch button 19 is mistakenly pressed in the range of the small amount of light since it is configured to maintain the first instruction value without setting the first instruction value to the second instruction value if the first instruction value when the switch button 19 is pressed is smaller than the threshold value. Accordingly, even when the user unintentionally presses the switch button 19, it is possible to suppress a large amount of illumination light from entering the user's eyes unexpectedly and to suppress observation with unnecessary brightness.

Second Modified Example of Embodiment

Figure 6:
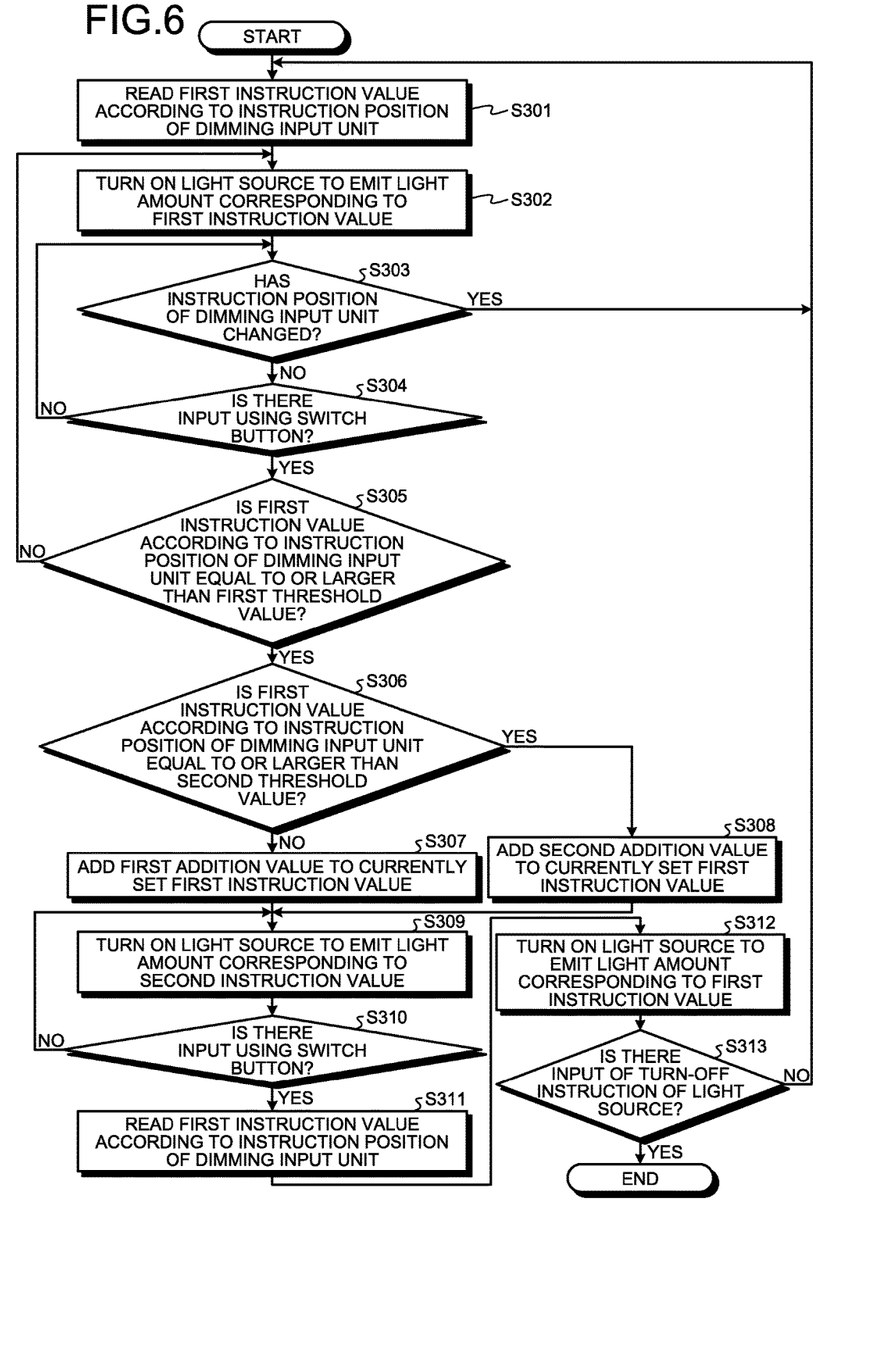
FIG. 6 is a flowchart for describing a dimming operation performed by a microscope apparatus according to a second modified example of the embodiment of the present disclosure.

Next, a second modified example of the embodiment of the present disclosure will be described. FIG. 6 is a flowchart for describing a dimming operation performed by a microscope apparatus according to the second modified example of the embodiment of the present disclosure. The microscope apparatus according to the second modified example has the same configuration as that of the microscope apparatus 1 described above. In this dimming operation, a light source of the illumination unit 16 is controlled under control of the control unit 23. Incidentally, the second modified example will be described assuming that the switching information storage unit 241 stores a first threshold value, a second threshold value larger than the first threshold value, a first addition value that is a first change amount, and a second addition value that is a second addition value larger than the first addition value.

When the microscope 10 and the microscope control device 20 are powered on, the input unit 21 reads the first instruction value corresponding to an instruction position of the dimming input unit 18 based on angle information input from the dimming input unit 18 with reference to the switching information storage unit 241 (Step S301).

When acquiring the first instruction value from the input unit 21, the control unit 23 turns on the light source 16a so as to emit illumination light having a light amount corresponding to the first instruction value (Step S302).

Thereafter, the control unit 23 determines whether or not the instruction position of the dimming input unit 18 has changed (Step S303). The control unit 23 determines the change of the instruction position in the same manner as in the Step S103 of FIG. 2 described above. When determining that the instruction position has changed (Step S303: Yes), the control unit 23 returns to Step S301 and performs light source control based on a newly input first instruction value. On the other hand, when determining that the instruction position has not changed (Step S303: No), the control unit 23 proceeds to Step S304.

In Step S304, the control unit 23 determines whether or not there is input using the switch button 19. When determining that there is no input from the switch button 19 (Step S304: No) in the same manner as in the Step S104 of FIG. 2 described above, the control unit 23 returns to Step S303. On the other hand, when determining that there is input from the switch button 19 (Step S304: Yes), the control unit 23 proceeds to Step S305.

In Step S305, the switching unit 22 determines whether or not the first instruction value according to the instruction position of the dimming input unit 18 is equal to or larger than the first threshold value. When determining that the first instruction value is smaller than the first threshold value (Step S305: No), the control unit 23 returns to Step S302 and causes the light source 16a to emit illumination light having the light amount corresponding to the first instruction value according to the instruction position of the dimming input unit 18. On the other hand, when determining that the first instruction value is equal to or larger than the first threshold value (Step S305: Yes), the control unit 23 proceeds to Step S306. Incidentally, the first threshold value is set to a value, for example, between 30% and 60% of the first upper limit value.

In Step S306, the switching unit 22 determines whether or not the first instruction value according to the instruction position of the dimming input unit 18 is equal to or larger than the second threshold value. When determining that the first instruction value is smaller than the second threshold value (Step S306: No), the control unit 23 proceeds to Step S307. On the other hand, when determining that the first instruction value is equal to or larger than the second threshold value (Step S306: Yes), the control unit 23 proceeds to Step S308. Incidentally, the second threshold value is set to a value, for example, between 60% and 80% of the first upper limit value, the value larger than the first threshold value.

In Step S307, the switching unit 22 sets the second instruction value by adding the first addition value to the currently set first instruction value of the light amount with reference to the switching information storage unit 241. After switching the first instruction value to the second instruction value, the control unit 23 proceeds to Step S309.

In addition, the switching unit 22 sets the second instruction value by adding the second addition value to the currently set first instruction value with reference to the switching information storage unit 241 in Step S308. After switching the first instruction value to the second instruction value, the control unit 23 proceeds to Step S309.

In Step S309, the control unit 23 turns on the light source 16a so as to emit illumination light having a light amount corresponding to the second instruction value set in Step S307 or S308.

In Step S310 subsequent to Step S309, the control unit 23 determines whether or not there is input using the switch button 19. When determining that there is no input from the switch button 19 (Step S310: No), the control unit 23 returns to Step S309. On the other hand, when determining that there is input from the switch button 19 (Step S310: Yes), the control unit 23 proceeds to Step S311.

In Step S311, the input unit 21 performs read of the first instruction value according to the instruction position of the dimming input unit 18 based on the angle information input from the dimming input unit 18 with reference to the switching information storage unit 241.

In Step S312 subsequent to Step S311, when acquiring the first instruction value from the input unit 21, the control unit 23 turns on the light source 16a so as to emit the illumination light having the light amount corresponding to the first instruction value.

In Step S313 subsequent to Step S312, the control unit 23 determines whether or not there is input of a turn-off instruction of the light source 16a. The control unit 23 determines whether or not the input unit 21 has received the input of the turn-off instruction of the light source 16a in the same manner as in Step S110 of FIG. 2 described above. When determining that there is no turn-off instruction (Step S313: No), the control unit 23 returns to Step S301 and continues the light source control. On the other hand, when determining that there is the turn-off instruction (Step S313: Yes), the control unit 23 ends the light source control described above.

Figure 7:
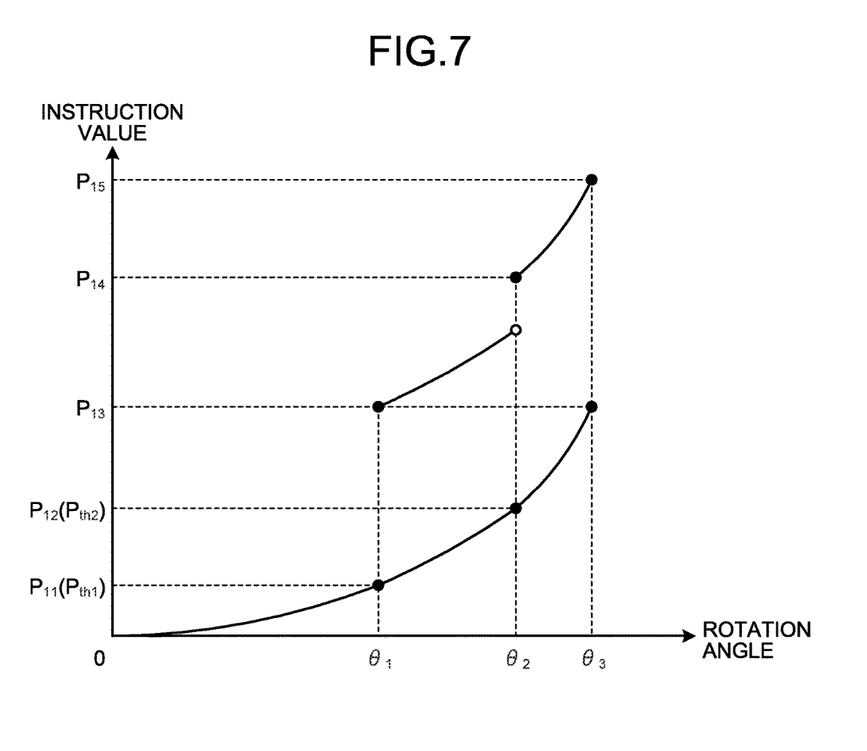
FIG. 7 is a view for describing the dimming operation performed by the microscope apparatus according to the second modified example of the embodiment of the present disclosure.

Here, a change of the instruction value over time in the above-described dimming operation will be described with reference to FIG. 7. FIG. 7 is a view for describing the dimming operation performed by the microscope apparatus according to the second modified example of the embodiment of the present disclosure. FIG. 7 is a graph with the horizontal axis representing a rotation angle of the dimming input unit 18 and the vertical axis representing the instruction value. As illustrated in FIG. 7, it is assumed that a first instruction value $P_{11}$ is acquired at a rotation angle $\theta_1$, and the first instruction value $P_{11}$ is set to a first threshold value $P_{th1}$. In addition, it is assumed that a first instruction value $P_{12}$ is acquired at a rotation angle $\theta_2$, and the first instruction value $P_{12}$ is set to a second threshold value $P_{th2}$. At this time, when the switch button 19 is pressed while the rotation angle is equal to or larger than $\theta_1$ and smaller than $\theta_2$, the instruction value is switched to the second instruction value obtained by adding the first addition value to the first instruction value according to the instruction position of the dimming input unit 18. For example, if the switch button 19 is pressed in a case where the first instruction value is $P_{11}$, the first instruction value $P_{11}$ is switched to a second instruction value $P_{13}$ obtained by adding the first addition value to the first instruction value $P_{11}$. When the switch button 19 is pressed while the rotation angle is equal to or larger than $\theta_2$ and equal to or smaller than $\theta_3$, the instruction value is switched to the second instruction value obtained by adding the second addition value to the first instruction value according to the instruction position of the dimming input unit 18. For example, if the switch button 19 is pressed in a case where the first instruction value is $P_{12}$, the first instruction value $P_{12}$ is switched to a second instruction value $P_{14}$ obtained by adding the second addition value to the first instruction value $P_{12}$. In addition, if the switch button 19 is pressed in a case where the first instruction value is $P_{13}$ at a rotation angle $\theta_3$, the instruction value is switched to a second instruction value $P_{15}$ obtained by adding the second addition value to the first instruction value $P_{13}$.

According to the second modified example described above, it is possible to achieve the effects of the above-described embodiment, and further, to finely switch an upward width of the light amount at the time of setting the high light amount by setting the plurality of threshold values for the first instruction value when the switch button 19 is pressed and changing the addition value according to the range defined by the threshold.

Third Modified Example of Embodiment

Figure 8:
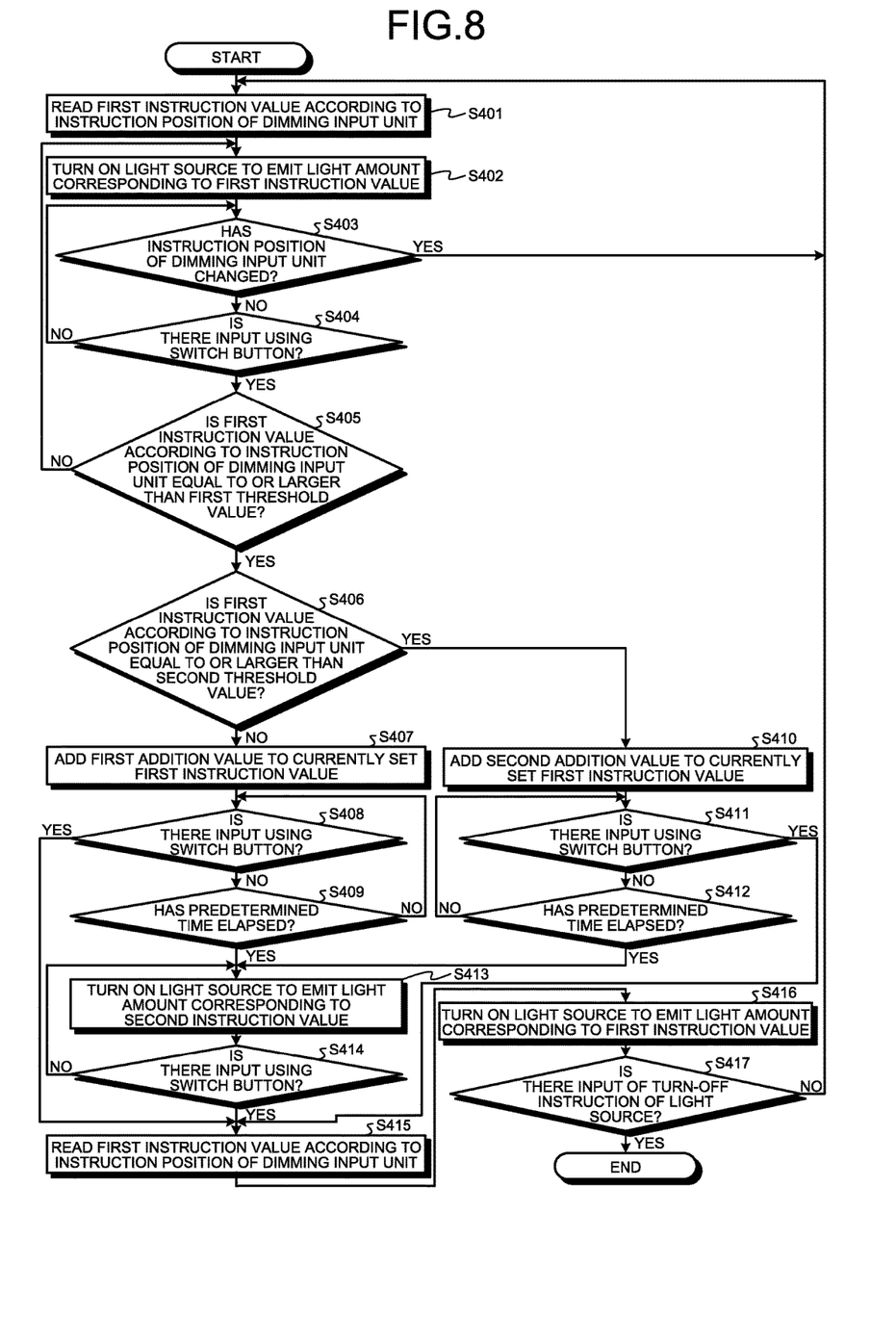
FIG. 8 is a flowchart illustrating a dimming operation performed by a microscope apparatus according to a third modified example of the embodiment of the present disclosure.

Next, a third modified example of the embodiment of the present disclosure will be described. FIG. 8 is a flowchart for describing a dimming operation performed by a microscope apparatus according to the third modified example of the embodiment of the present disclosure. The microscope apparatus according to the third modified example has the same configuration as that of the microscope apparatus 1 described above. In this dimming operation, a light source of the illumination unit 16 is controlled under control of the control unit 23. Incidentally, the third modified example will be described assuming that the switching information storage unit 241 stores first and second threshold values and first and second addition values similarly to the second modified example described above.

When the microscope 10 and the microscope control device 20 are powered on, the input unit 21 reads the first instruction value corresponding to an instruction position of the dimming input unit 18 based on angle information input from the dimming input unit 18 with reference to the switching information storage unit 241 (Step S401).

When acquiring the first instruction value from the input unit 21, the control unit 23 turns on the light source 16a so as to emit illumination light having a light amount corresponding to the first instruction value (Step S402).

Thereafter, the control unit 23 determines whether or not the instruction position of the dimming input unit 18 has changed (Step S403). The control unit 23 determines the change of the instruction position in the same manner as in the Step S103 of FIG. 2 described above. When determining that the instruction position has changed (Step S403: Yes), the control unit 23 returns to Step S401 and performs light source control based on a newly input first instruction value. On the other hand, when determining that the instruction position has not changed (Step S403: No), the control unit 23 proceeds to Step S404.

In Step S404, the control unit 23 determines whether or not there is input using the switch button 19. When determining that there is no input from the switch button 19 (Step S404: No) in the same manner as in the Step S104 of FIG. 2 described above, the control unit 23 returns to Step S403. On the other hand, when determining that there is input from the switch button 19 (Step S404: Yes), the control unit 23 proceeds to Step S405.

In Step S405, the switching unit 22 determines whether or not the first instruction value according to the instruction position of the dimming input unit 18 is equal to or larger than the first threshold value. When determining that the first instruction value is smaller than the first threshold value (Step S405: No), the control unit 23 returns to Step S402 and causes the light source 16a to emit illumination light having the light amount corresponding to the first instruction value according to the instruction position of the dimming input unit 18. On the other hand, when determining that the first instruction value is equal to or larger than the first threshold value (Step S405: Yes), the control unit 23 proceeds to Step S406.

In Step S406, the switching unit 22 determines whether or not the first instruction value according to the instruction position of the dimming input unit 18 is equal to or larger than the second threshold value. When determining that the first instruction value is smaller than the second threshold value (Step S406: No), the control unit 23 proceeds to Step S407. On the other hand, when determining that the first instruction value is equal to or larger than the second threshold value (Step S406: Yes), the control unit 23 proceeds to Step S410.

In Step S407, the switching unit 22 sets the second instruction value by adding the first addition value to the currently set first instruction value with reference to the switching information storage unit 241.

In Step S408 subsequent to Step S407, the control unit 23 determines whether or not there is input using the switch button 19. When determining that there is input from the switch button 19 (Step S408: Yes), the control unit 23 proceeds to Step S415. On the other hand, when determining that there is no input from the switch button 19 (Step S408: No), the control unit 23 proceeds to Step S409.

In Step S409, the control unit 23 determines whether or not a predetermined time has elapsed after the previous input using the switch button 19. When determining that the predetermined time has not elapsed (Step S409: No), the control unit 23 returns to Step S408. On the other hand, when determining that the predetermined time has elapsed (Step S409: Yes), the control unit 23 proceeds to Step S413.

In addition, the switching unit 22 sets the second instruction value by adding the second addition value to the currently set first instruction value with reference to the switching information storage unit 241 in Step S410.

In Step S411 subsequent to Step S410, the control unit 23 determines whether or not there is input using the switch button 19. When determining that there is input from the switch button 19 (Step S411: Yes), the control unit 23 proceeds to Step S415. On the other hand, when determining that there is no input from the switch button 19 (Step S411: No), the control unit 23 proceeds to Step S412.

In Step S412, the control unit 23 determines whether or not a predetermined time has elapsed after the previous input using the switch button 19. When determining that the predetermined time has not elapsed (Step S412: No), the control unit 23 returns to Step S411. On the other hand, when determining that the predetermined time has elapsed (Step S412: Yes), the control unit 23 proceeds to Step S413.

Here, the predetermined time to be determined in Step S409 and the predetermined time to be determined in Step S412 may be the same time or times different from each other. These predetermined times are set in advance and stored in the switching information storage unit 241.

In Step S413, the control unit 23 turns on the light source 16*a* so as to emit illumination light having a light amount corresponding to the second instruction value set in Step S407 or S410.

In Step S414 subsequent to Step S413, the control unit 23 determines whether or not there is input using the switch button 19. When determining that there is no input from the switch button 19 (Step S414: No), the control unit 23 returns to Step S413. On the other hand, when determining that there is input from the switch button 19 (Step S414: Yes), the control unit 23 proceeds to Step S415.

In Step S415, the input unit 21 performs read of the first instruction value according to the instruction position of the dimming input unit 18 based on the angle information input from the dimming input unit 18 with reference to the switching information storage unit 241.

In Step S415 subsequent to Step S416, when acquiring the first instruction value from the input unit 21, the control unit 23 turns on the light source 16*a* so as to emit the illumination light having the light amount corresponding to the first instruction value.

In Step S417 subsequent to Step S416, the control unit 23 determines whether or not an instruction to turn off the light source 16*a* is input. The control unit 23 determines whether or not the input unit 21 has received the input of the turn-off instruction of the light source 16*a* in the same manner as in Step S110 of FIG. 2 described above. When determining that there is no turn-off instruction (Step S417: No), the control unit 23 returns to Step S401 and continues the light source control. On the other hand, when determining that there is the turn-off instruction (Step S417: Yes), the control unit 23 ends the light source control described above.

According to the third modified example described above, it is possible to achieve the effects of the embodiment and the second modified example described above, and further, to cancel the switching operation even when the switch button 19 is erroneously pressed since it is configured such that the instruction value is switched to the second instruction value after waiting for the predetermined time from pressing of the switch button 19. Accordingly, even when the user unintentionally presses the switch button 19, it is possible to suppress a large amount of illumination light from entering the user's eyes unexpectedly and to suppress observation with unnecessary brightness.

Incidentally, the third modified example described above may be combined with the embodiment and the first modified example such that the standby time is set in the embodiment and the first modified example.

The above-described embodiment and modified examples are merely examples to carry out the present disclosure, and the present disclosure is not limited thereto. In addition, the present disclosure allows various disclosures to be formed by appropriately combining a plurality of components disclosed in the respective embodiments. The present disclosure may be modified in various manners in accordance with specifications. Further, it is obvious that other various embodiments may be implemented within a scope of the present disclosure, from the above description.

Although the description has been given assuming that the switching information storage unit 241 stores the addition value and the switching unit 22 calculates the second instruction value by adding the additional value to the first instruction value in the embodiment and the modified examples described above, it may be configured such that the switching information storage unit 241 stores a table in which the first instruction value according to the instruction position of the dimming input unit 18 and the second instruction value are associated with each other and the switching unit 22 calculates the second instruction value obtained from the first instruction value with reference to this table.

In addition, the description has been given assuming that the microscope 10 and the microscope control device 20 are provided as separate bodies in the embodiment and the modified examples. However, the configuration of the microscope control device 20 may be provided inside the main body 11 of the microscope 10 such that the microscope 10 and the microscope control device 20 are integrated.

In addition, the description has been given assuming that the switching unit 22 performs setting or canceling of the second instruction value by pressing the switch button 19 in the embodiment and the modified example, but the setting of the second instruction value is not limited to the pressing of the switch button 19. For example, the dimming input unit 18 may be provided so as to freely advance and retreat so as to serve the function of the switch button 19, or the switching signal may be input via a touch panel provided in the microscope control device 20 or the like.

In addition, the description has been given assuming that the switching unit 22 performs setting or canceling of the second instruction value by pressing the switch button 19 in the embodiment and the modified example, but the canceling of the second instruction value may be performed, for example, using the operation of the dimming input unit 18, that is, the change of the first instruction value as a trigger or using the lapse of the predetermined time after setting of the second instruction value as a trigger without being limited to the pressing of the switch button 19. In the case where the operation of the dimming input unit 18 is used as the trigger, the switching unit 22 sets the changed first instruction value, and the control unit 23 causes the light source 16a to emit the illumination light having the light amount according to the instruction position of the dimming input unit 18. It is possible to prevent the illumination light having the high light amount from being continuously emitted due to forgetting to push the switch button 19 if the setting is controlled to return to the first instruction value after a lapse of a predetermined time, and thus, it is possible to suppress wasteful power consumption.

According to the present disclosure, it is possible to adjust brightness of a field of view by a simple operation system.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope apparatus comprising:
    a light source configured to emit illumination light to illuminate a specimen;
    a dimming input unit configured to set and input a light amount of the light source in a predetermined dimming range;
    a switching unit configured to switch a first instruction value instructing the light amount of the light source to a second instruction value larger than the first instruction value when a switching signal to switch the light amount of the light source is input; and
    a control unit configured to control a light amount of the illumination light emitted from the light source according to the first instruction value set and input by the dimming input unit or the second instruction value obtained by switching by the switching unit.

2. The microscope apparatus according to claim 1, further comprising
    a storage unit configured to store a threshold value configured to determine switching to the second instruction value by the switching unit,
    wherein the switching unit performs switching to the second instruction value when the first instruction value is equal to or larger than the threshold value.

3. The microscope apparatus according to claim 1, further comprising
    a storage unit configured to store first and second threshold values configured to determine switching to the second instruction value by the switching unit, the second threshold value being larger than the first threshold value,
    wherein the switching unit switches the first instruction value to the second instruction value with a first change amount when the first instruction value is equal to or larger than the first threshold value and smaller than the second threshold value, and switches the first instruction value to the second instruction value with a second change amount larger than the first change amount when the first instruction value is equal to or larger than the second threshold value.

4. The microscope apparatus according to claim 1, wherein
    the control unit causes the light source to emit the illumination light having a light amount corresponding to the second instruction value after a lapse of a predetermined time when the switching signal is not input within the predetermined time after input of the switching signal, and causes the light source to emit the illumination light having a light amount corresponding to the first instruction value after the lapse of the predetermined time when the switching signal is input within the predetermined time after input of the switching signal.

5. The microscope apparatus according to claim 1, wherein
    the switching unit returns the second instruction value to the first instruction value after switching to the second instruction value based on an elapsed time after input of the switching signal, setting input performed by the dimming input unit, or switching to the second instruction value.

6. The microscope apparatus according to claim 1, wherein
    the second instruction value is larger than an upper limit value of the dimming range.

* * * * *